No. 667,629. Patented Feb. 5, 1901.
E. J. KELLEY.
CORN PLANTER AND MARKER.
(Application filed Mar. 30, 1900.)
(No Model.) 2 Sheets—Sheet 2.
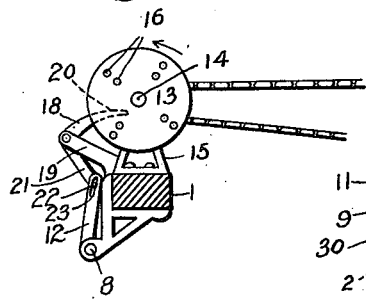
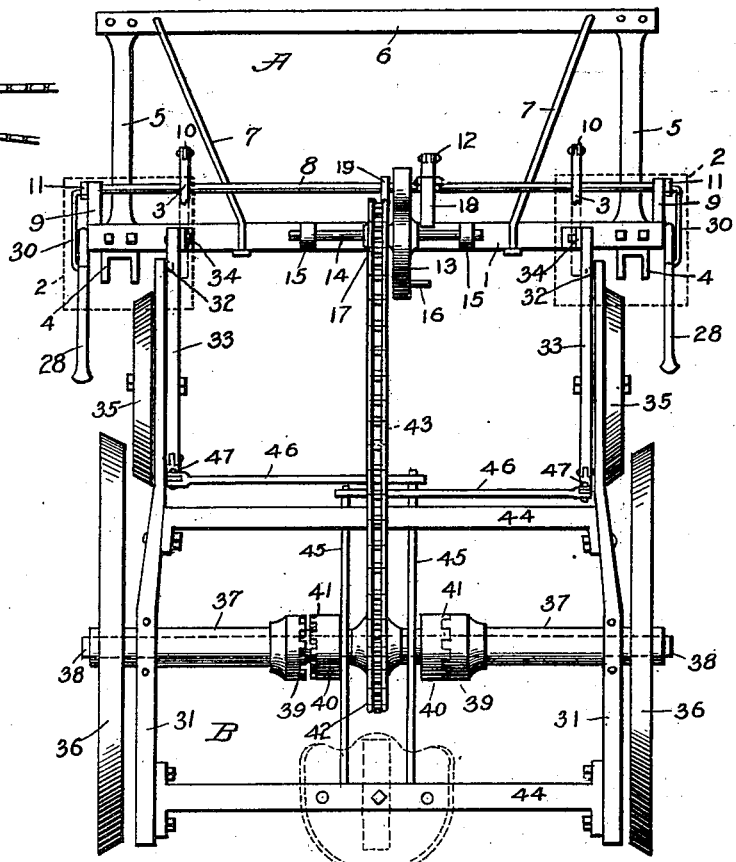
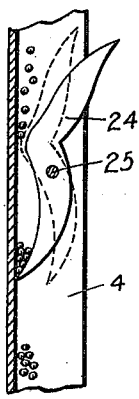
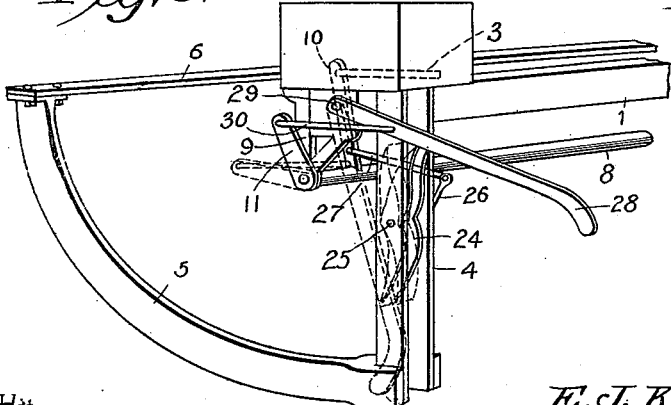
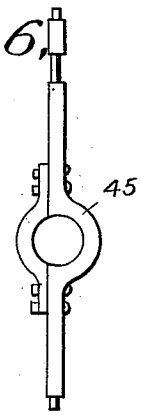
Witnesses
Howard D. Orr
J. W. Garner
E. J. Kelley, Inventor,
by C. A. Snow & Co.
Attorneys

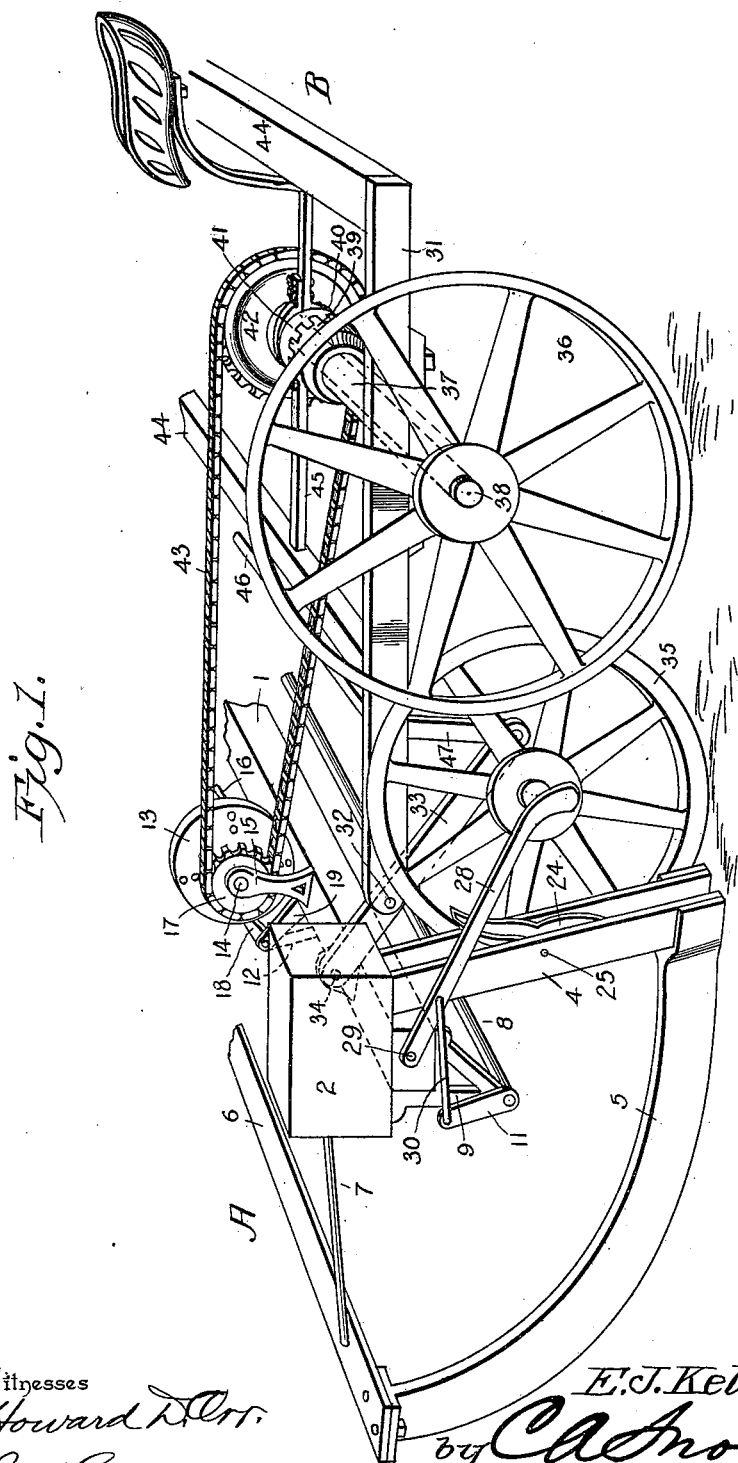

UNITED STATES PATENT OFFICE.

EDWARD J. KELLEY, OF ABERDEEN, SOUTH DAKOTA, ASSIGNOR TO LORETTA KELLEY, OF SAME PLACE.

CORN-PLANTER AND MARKER.

SPECIFICATION forming part of Letters Patent No. 667,629, dated February 5, 1901.

Application filed March 30, 1900. Serial No. 10,866. (No model.)

*To all whom it may concern:*

Be it known that I, EDWARD J. KELLEY, a citizen of the United States, residing at Aberdeen, in the county of Brown and State of South Dakota, have invented a new and useful Corn-Planting and Marking Machine, of which the following is a specification.

My invention is an improved check-row corn-planter adapted for planting two rows of corn at a time; and it consists in the peculiar construction and combination of devices hereinafter fully set forth, and pointed out in the claims.

One object of my invention is to provide means to compensate for stones, depressions, ridges, and other obstructions in the paths of the traction-wheels which communicate power to the corn-planting mechanism, whereby such obstructions will not cause the planter to vary in its operation and plant the corn in other than check-rows.

A further object of my invention is to effect improvements in the corn-planting mechanism.

In the accompanying drawings, Figure 1 is a perspective view of a portion of a check-row corn-planter constructed in accordance with my invention. Fig. 2 is a top plan view of the same. Fig. 3 is a detail perspective view. Fig. 4 is a detail elevation, partly in section. Fig. 5 is a detail sectional view of a portion of one of the seed tubes or spouts, showing the seed-dropping valve therein. Fig. 6 is a detail view of one of the rocking yokes.

The frame of my improved check-row corn-planter comprises the front runner-section A and the rear section B. The front section has a cross-bar 1, on the ends of which are the seed boxes or hoppers 2, each of which is provided with a reciprocating feed-slide 3, which may be of the ordinary construction. The seed spouts or tubes 4 depend from the seed-boxes, and to the lower ends thereof are attached the rear ends of the furrow-opening shoes or runners 5. The front upwardly-curved ends of said shoes or runners are connected together by a cross-bar 6. Brace-rods 7 connect the cross-bars 1 6. A rock-shaft 8 is disposed under the cross-bar 1 and is journaled in brackets or hangers 9, which depend from said cross-bar. Said rock-shaft is provided with rock-arms 10, which are connected to the seed-slides 3 and operate said seed-slides when said rock-shaft is oscillated. Said rock-shaft is further provided at its ends with rock-arms 11 and is provided at or near its center with a rock-arm 12. A wheel 13 is journaled on a shaft 14, which is mounted in bearings 15 on cross-bar 1, and said wheel is provided on one side with a series of tappets 16. A sprocket-wheel 17 is also secured on shaft 14. An oscillating tappet-link 18 is mounted on a support 19, which projects from cross-bar 1. The said tappet-link has a member 20, which is disposed in the path of the tappets 16, and has an arm 21, which is connected to the rock-arm 12 of rock-shaft 8 by a pin 22, which operates in a slot 23, with which the arm 12 is provided. It will be understood from the foregoing and by reference to the drawings that when the wheel 13 is rotated in the direction indicated by the arrow in Fig. 4 oscillating motion will be communicated to the shaft 8 and that the latter through the arms 10 will communicate reciprocatory motion to the slides 3.

In the seed-spouts 4 are seed-dropping valves 24. Each of said valves is on a shaft 25, which is journaled in the sides of a seed-spout, and said shafts 25 are provided at their inner ends with rock-arms 26, which are connected to the arms 10 of rock-shaft 8 by links 27. Hence the oscillating motion of the rock-shafts 8 will be communicated to the valves 24, and the latter will be operated in such manner as to drop the seeds into the furrows, the seeds having been previously dropped onto the said valves by the seed-slides in the hoppers, as will be understood.

Markers 28, which are of suitable construction, have their upper ends pivoted to suitable supports, the said marker-arms being here shown as having their upper ends pivoted on the ends of cross-bar 1, as at 29. Said markers are connected to the rock-arms 11 of rock-shaft 8 by a link 30, and it will be understood that the markers when the rock-shaft is oscillated, so as to actuate the seed-slides and seed-dropping valves, as hereinbefore described, are also actuated and are caused to engage and mark the ground on the outer side of the seed-spouts at places which are in line with the hills of corn planted by the machine.

The rear or wheel frame B of the machine has its side bars 31 connected by pivots 32 at their front ends to trail-bars 33, which are pivotally connected at their front ends to the cross-bar 1 of front frame-section A, as at 34, said trail-bars extending rearwardly and being inclined downwardly from said cross-bar 1. The said trail-bars carry pilot-wheels 35, which are disposed in advance of the wheels 36, which support the frame-section B. Said pilot-wheels may be either directly in line with the supporting-wheels 36, or, as here shown, they may be disposed slightly within the wheels 36. The latter are provided with cylindrical hub-sleeves 37, which revolve on the axle-shaft 38, and said hub-sleeves are provided at their inner ends with clutch members 39. A sleeve 40 is also loosely mounted on the shaft 38 and is disposed centrally thereon and between the clutch members 39. Said sleeve 40 has clutch members 41 at its ends, which are adapted to alternately engage clutch members 39, the length of said sleeve 40 being such that the same is adapted to be moved longitudinally on the axle-shaft 38, so as to cause said sleeve 40 to be clutched with either of the sleeves 37, and the said sleeve 40 is provided with a sprocket-wheel 42, which is connected to the sprocket-wheel 17 on shaft 14 by an endless sprocket-chain 43. The rear frame B is provided at a suitable distance in front and rear of axle-shaft 38 with a pair of cross-bars 44, in which are journaled a pair of longitudinally-disposed rocking yokes 45, which are disposed, respectively, on the inner sides of clutch members 41 of sleeve 40 and are adapted when said rocking yokes are oscillated or partly turned to move said sleeve 40 lengthwise, so as to engage the same with one of the sleeves 37. At the front ends of the rocking yokes 45 are transversely-disposed rock-arms 46. The outer ends of said rock-arms 46 are connected flexibly to the upper ends of links 47, which rise from the rear ends of the trail-bars 33, which carry the pilot-wheels 35. The said trail-bars, rocking yokes, and their connections constitute shifting mechanisms which are adapted to engage the operating-wheel 42 of the seed-dropping and hill-marking mechanisms with either of the traction-wheels 36, so that the said seed-dropping and marking mechanisms may be actuated by either of said traction-wheels.

When the machine is in operation, the sleeve 40, which carries the operating-wheel 42, will be clutched to one of the traction-wheels 36 and unclutched from the other. Assuming that a ridge, stone, hole, depression, or other inequality in the ground exists in the path of the engaged traction-wheel, which obstruction or inequality would cause the said engaged wheel in passing over the same to turn farther than the disengaged wheel, and thereby cause the seed-dropping mechanism to plant the hills out of line with those previously planted, this difficulty is avoided by the pilot-wheel in advance of said engaged traction-wheel and the shifting mechanism operated by the said pilot-wheel, because the latter, which is in advance of the engaged traction-wheel, will rise or descend when passing over the said obstruction, thereby actuating the shifting mechanism connected thereto and causing the said shifting mechanism to unclutch the operating-wheel from the engaged traction-wheel and clutch the same with the hitherto-disengaged traction-wheel, which is not affected by the said obstruction, and hence there will be no variations in the operation of the seed-planting mechanism and the hills will be planted in check-rows.

Having thus described my invention, I claim—

1. In a check-row corn-planter, the combination of a pair of seed-dropping mechanisms, a pair of traction-wheels, an operating-wheel connected to and actuating said seed-dropping mechanisms, said operating-wheel being adapted to be engaged with said respective traction-wheels alternately, a pair of pilot-wheels in advance of the respective traction-wheels and shifting mechanisms actuated by said pilot-wheels, as the latter pass over an obstruction, to engage the said operating-wheel with said traction-wheels, for the purpose set forth, substantially as described.

2. In a check-row corn-planter, the combination of a pair of seed-dropping mechanisms, a pair of traction-wheels, an operating-wheel connected to and actuating said seed-dropping mechanisms, said operating-wheel being adapted to be shifted into and out of engagement with said respective traction-wheels, a pair of vertically-movable supports, a pair of pilot-wheels carried thereby and disposed in advance of the respective traction-wheels, rocking yokes to shift said operating-wheel into engagement with the respective traction-wheels and connections between said rocking yokes and said vertically-movable supports for said pilot-wheels, whereby said rocking yokes are actuated, substantially as described.

3. In a check-row corn-planter, the combination of a pair of seed-dropping mechanisms, an operating-wheel therefor, a pair of vertically-movable wheels which rotate by contact with the earth and are disposed substantially in line with the seed-dropping mechanisms and gears engaged and disengaged by the vertical movements of said wheels, to communicate power to said operating-wheel, for the purpose set forth, substantially as described.

EDWARD J. KELLEY.

Witnesses:
LUCIUS M. CATLIN,
B. NANSON.